No. 800,055. PATENTED SEPT. 19, 1905.
H. C. AYRES.
COVER FOR ELECTRICAL CONDUITS.
APPLICATION FILED MAR. 13, 1905.

Witnesses
R. A. Boswell
Clara S. Davenport

Inventor
Henry C. Ayres
By Franklin H. Hough
Attorney

UNITED STATES PATENT OFFICE.

HENRY C. AYRES, OF GREENVILLE, OHIO, ASSIGNOR TO THE ADJUSTABLE FIXTURE AND MANUFACTURING COMPANY, OF GREENVILLE, OHIO.

COVER FOR ELECTRICAL CONDUITS.

No. 800,055.   Specification of Letters Patent.   Patented Sept. 19, 1905.

Application filed March 13, 1905. Serial No. 249,908.

*To all whom it may concern:*

Be it known that I, HENRY C. AYRES, a citizen of the United States, residing at Greenville, in the county of Darke and State of Ohio, have invented certain new and useful Improvements in Covers for Electrical Conduits; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in covers for electrical conduits; and the object of the invention is to produce a simple and efficient means whereby electric wiring may be securely held in a conduit and so arranged that access may be readily had to the conduit for inserting or removing the wire, and at the same time affording an ornamental apparatus for attachment to the ceiling or walls of a room.

My invention consists, further, in various details of construction and in arrangements of parts which will be hereinafter fully described, and then specifically defined in the appended claim.

My invention is illustrated in the accompanying drawings, which, with the letters of reference marked thereon, form a part of this application, and in which drawings—

Figure 1:
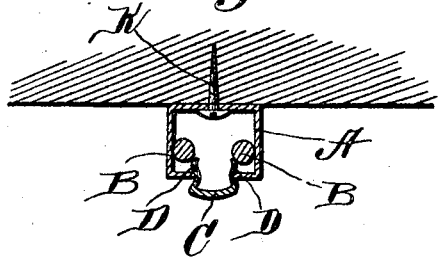
Figure 2:
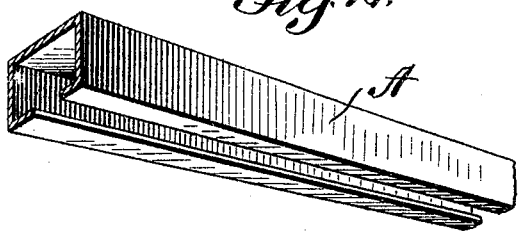
Figure 3:
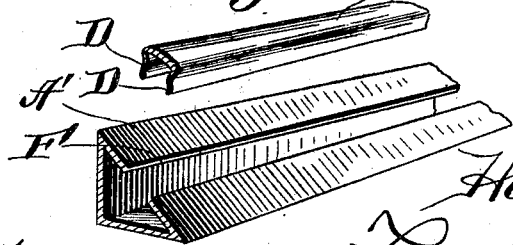

Figure 1 is a cross-sectional view through a conduit, showing my improved cover therefor. Fig. 2 is a perspective view showing the manner of application of the cover to the conduit. Fig. 3 is a perspective view of a slight modification in the shape of the conduit, and Fig. 4 is a sectional view through the modified form.

Reference now being had to the details of the drawings by letter, A designates a conduit, which in Fig. 1 of the drawings is shown substantially rectangular in cross-section and is provided with an opening between its longitudinal edges for the reception of the wires or conductors B.

C designates my improved cover for the conduit, which may be made of any ornamental design and provided with resilient wings or flanges D upon the longitudinal edges thereof, which are preferably of the form shown in the drawings and adapted to yield as the cover is inserted through the opening in the conduit and to expand and hold the cover in place in the manner shown in Fig. 1 of the drawings. When the cover is applied to the conduit and when the conduit is adapted to be fastened to the ceiling of a room, the wires, it will be observed, may rest upon the inner ends of the flanged portions of the cover and out of contact with the inturned edges of the conduit.

Figure 4:
Figure 4:
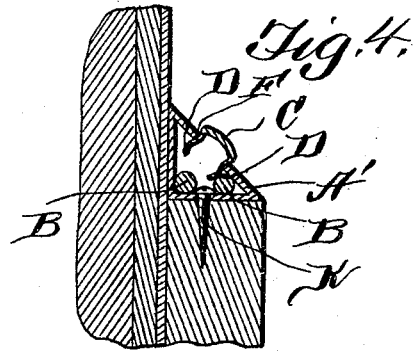

In Figs. 3 and 4 of the drawings I have shown a slight differentiation in the shape of the conduit A', the same in the modified form being of triangular shape having an opening F in the inclined face thereof for the reception of the cover C, said modified form being of a convenient shape for attachment to the edge of a wainscoting or a foot-board or other ledge, and at the same time affording an ornamental finish. In each of the forms shown the conduits are fastened to the wall or other object by means of screws K or other suitable fastening means.

From the foregoing it will be observed that a simple and efficient means is afforded for having ready access to the conduit by simply pulling out the cover, which will be readily released from the conduit, the resilient flanges of the cover yielding to allow the cover to be readily withdrawn.

While I have shown certain shapes of conduit as embodying the features of my invention, it will be understood that I may vary the same to meet different conditions, if desired, without departing from the spirit of the invention.

Having thus fully described my invention, what I claim as new, and desire to secure by Letters Patent, is—

In combination with a metallic conduit, the opposite sides of which have angled flanges with a space intervening between the same, a cover having its opposite edges undulating and resilient, and designed to spring into the space intermediate the edges of said flanges and frictionally engage the same, as shown and described.

In testimony whereof I hereunto affix my signature in presence of two witnesses.

HENRY C. AYRES.

Witnesses:
 A. L. HOUGH,
 FRANKLIN H. HOUGH.